Dec. 28, 1926.
J. HOFFAY
1,612,720
SAFETY DEVICE FOR USE WITH PASSENGER VEHICLES
Filed Dec. 2, 1921          4 Sheets-Sheet 1
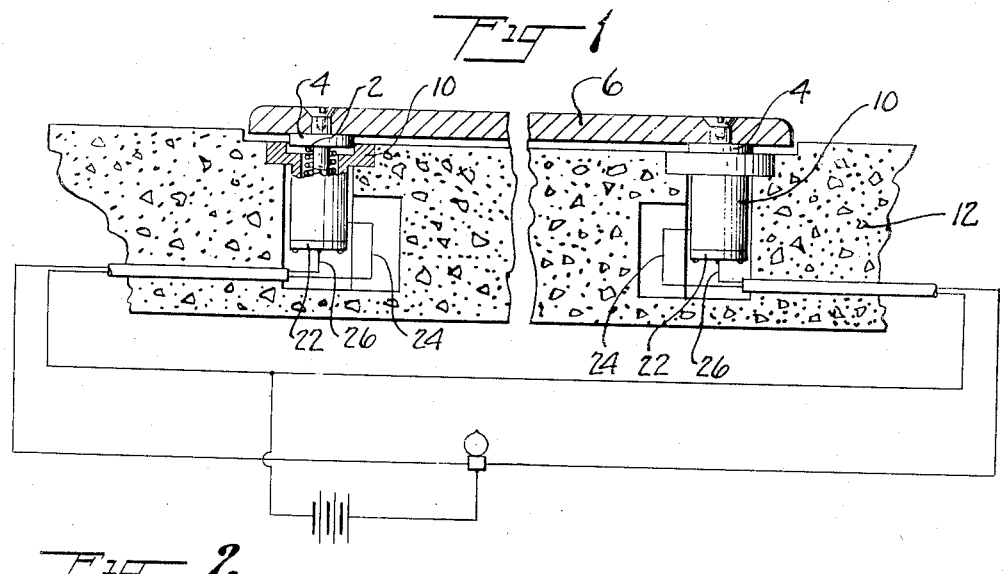
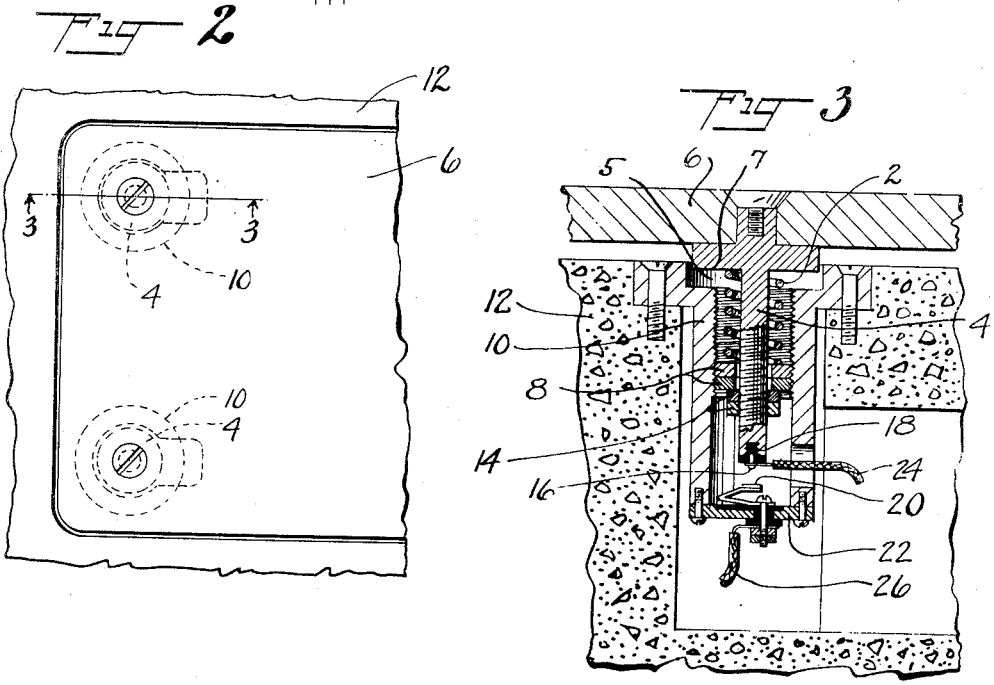
Joseph Hoffay INVENTOR
BY
ATTORNEYS Dec. 28, 1926.

J. HOFFAY 1,612,720

SAFETY DEVICE FOR USE WITH PASSENGER VEHICLES

Filed Dec. 2, 1921      4 Sheets-Sheet 2

Joseph Hoffay INVENTOR
BY Newell
ATTORNEYS

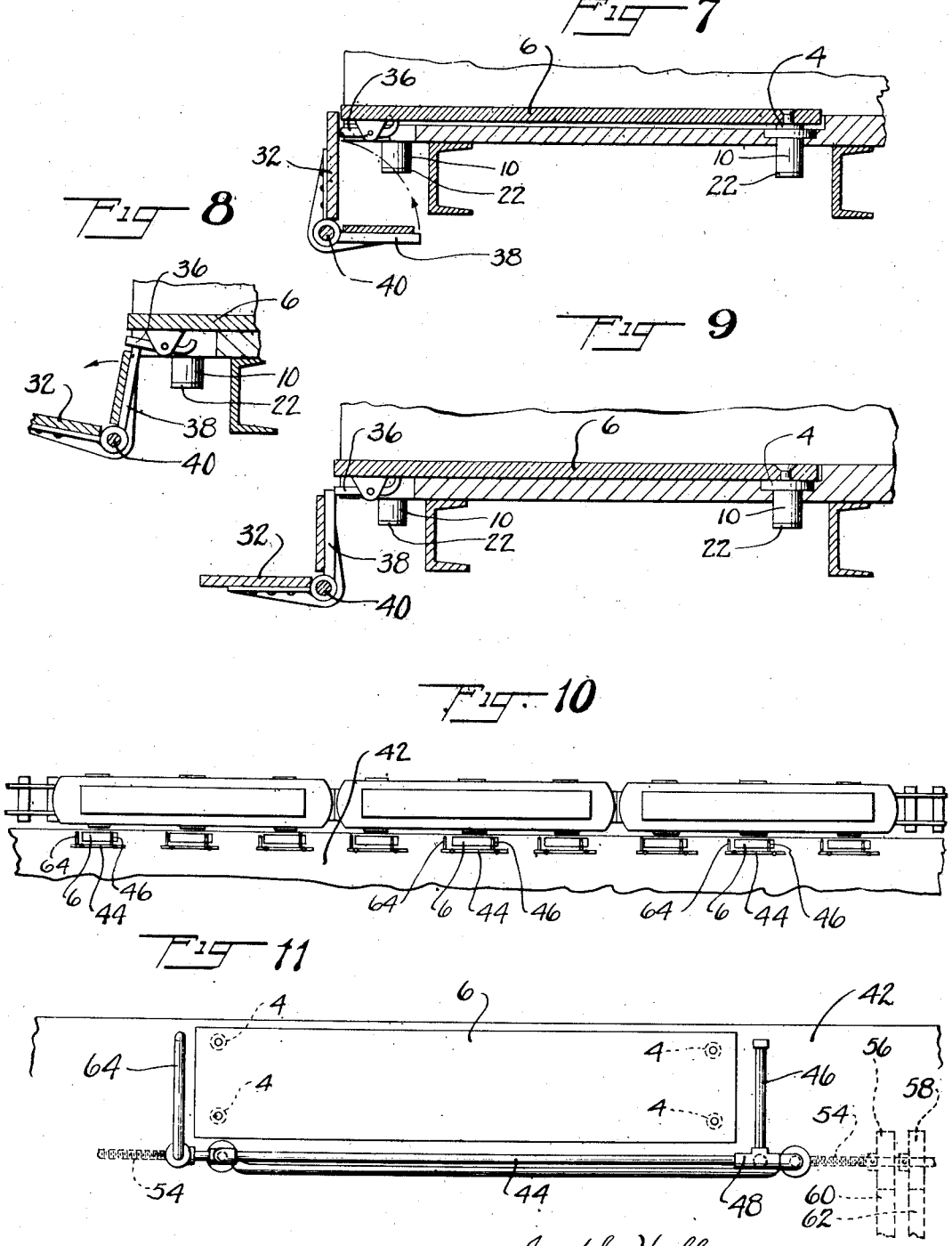

Dec. 28, 1926.
J. HOFFAY
1,612,720
SAFETY DEVICE FOR USE WITH PASSENGER VEHICLES
Filed Dec. 2, 1921   4 Sheets-Sheet 4
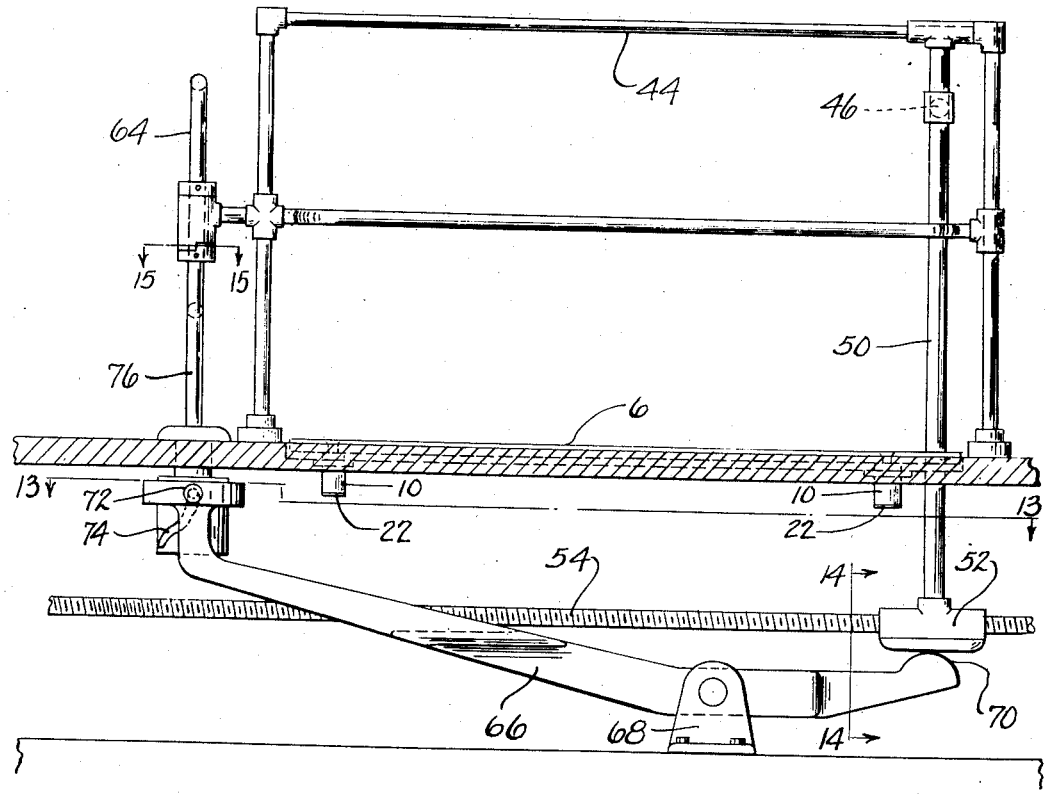
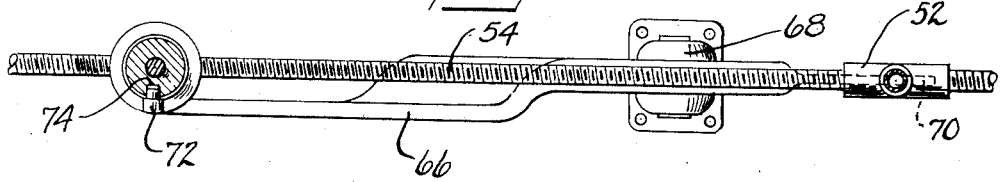
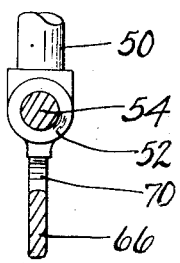
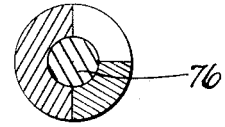
Joseph Hoffay INVENTOR
BY Newell and Spencer
ATTORNEYS Patented Dec. 28, 1926.

1,612,720

UNITED STATES PATENT OFFICE.

JOSEPH HOFFAY, OF NEW YORK, N. Y.

SAFETY DEVICE FOR USE WITH PASSENGER VEHICLES.

Application filed December 2, 1921. Serial No. 519,566.

This invention relates to means for controlling and indicating the entrance of passengers into or their exit from passenger carrying vehicles, and particularly to means which will reduce the amount of personal supervision required to prevent accidents due to the starting of a passenger carrying vehicle before the passenger or passengers are completely on the vehicle or have completely left the vehicle.

The invention is herein shown as embodied in several types of passenger carrying vehicles, and also in station platforms used in connection therewith, but it will be understood that all uses of the invention are not herein illustrated and that the invention is susceptible of other embodiments not herein shown and described.

In the accompanying drawings—

Fig. 1 is a vertical sectional view through a safety platform embodying a part of the present invention;

Fig. 2 is a partial plan view of a platform such as shown in Fig. 1;

Fig. 3 is a sectional detail through one of the counterbalancing platform supports showing one form of electrical connection for use in connection with these platforms;

Fig. 7 is a section on the line 7—7 of Fig. 6;

Fig. 8 is a detail section similar to Fig. 7 but showing the entrance step in a different position;

Fig. 9 shows the entrance step locked in open position through the safety platform;

Fig. 10 shows the invention as applied to platforms used in transferring passengers to and from trains;

Fig. 11 is an enlarged plan view of the passenger controlling means shown in Fig. 10;

Fig. 12 is a vertical elevation partly in section, of the passenger controlling means shown in Fig. 11;

Fig. 13 is a section on the line 13—13 of Fig. 12; and

Figure 4:
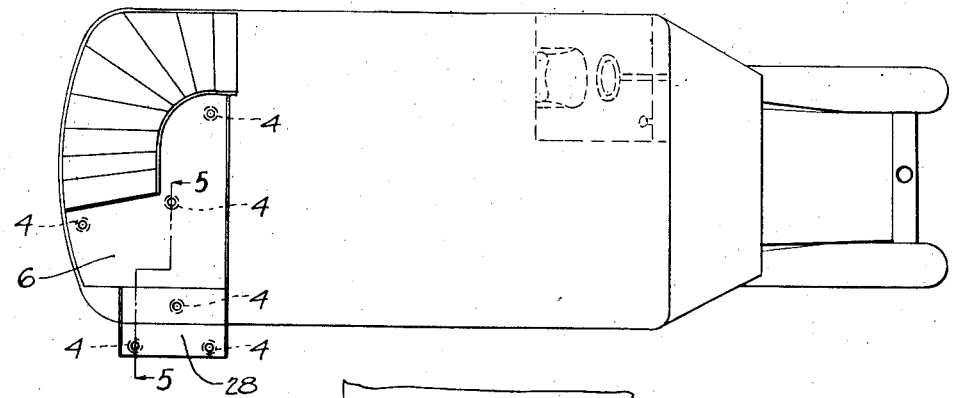
Fig. 4 is a plan view, somewhat diagrammatic, showing the invention as applied to a passenger carrying bus.

Figs. 14 and 15 are respectively sections on the line 14—14 and 15—15 of Fig. 12.

In carrying out the invention whether it is applied to the passenger carrying vehicle itself or to the platform used in facilitating entrance to and from passenger carrying vehicles, I preferably provide a counterbalanced platform such as shown in Fig. 1 of the drawings, over which the passenger must pass both when entering the vehicle and when leaving it. It will be understood, of course, that in some cases, as, for example, where the passenger enters the vehicle adjacent to the motorman, it will not be necessary to provide such a platform at the entrance end. This might also be true if the exit end were adjacent to the motorman. In any case, however, where either the entrance or the exit is not under the immediate supervision of the motorman, a platform of this general type will preferably be employed.

The platform may be counterbalanced in various ways, a convenient means for counterbalancing the platform being illustrated in Figs. 1 to 3 inclusive, and comprising springs 2 surrounding plungers 4 connected to the platform 6, these plungers being guided through adjustable bottoms 8 preferably threaded in cast sockets 10 supported in the stationary platform 12. By tightening said adjustable bottoms 8 against one another, the lower one serving as locking means to the other one, a proper adjustment may be secured, the adjustment being preferably such that the movable platform 6 is held at the desired distance above the stationary platform 12, this distance and the amount of tension put upon the springs 2 being further determined, if desired, by the adjusting nuts 14 threaded upon the plunger 4, and which may also provide a fixed ascending stop therefor. Through such adjustment and use of nuts 14 as described, the lower surface of a shoulder 7, preferably carried by plunger 4, may be kept within a recess 5 in cast socket 10, thus affording guidance and a maximum descending stop therefor. The upper end of plunger 4 is preferably threaded so as to receive an ordinary screw for making secure the movable platform 6 after it is connected thereon.

At its lower end the plunger 4 may carry any suitable electrical terminal 16 insulated from the plunger by insulation 18, the terminal 16 constituting one member of a switch in an electrical signaling or controlling circuit of which the other member 20 may be mounted in the bottom 22 of the lower chamber in the socket 10. Suitable leads 24 and 26 from the terminals 16 and 20 may connect the terminals either with a signal or with means for controlling the operating mechanism of the passenger carrying vehicle to prevent starting of the vehicle so long as the switch members 16 and 20 are in contact.

It will be understood that a sufficient number of counter-balancing springs 2 are located under the platform to insure proper support of the platform and proper balancing and that the respective pairs of switch members 16 and 20 under each point of support of the counter-balanced platform 6 are connected in parallel in the circuit to the signaling means or to the controlling means. It will be understood, of course, that both signaling and controlling means may be employed if desired.

Figure 5:
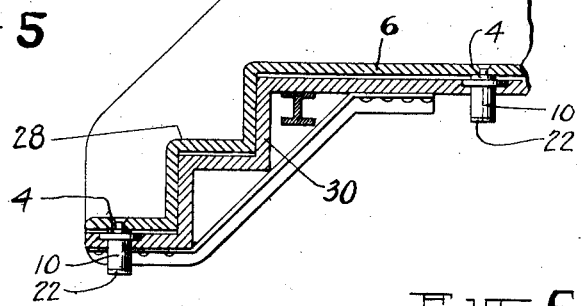
Fig. 5 is a section on the line 5—5 of Fig. 4.
Figure 6:
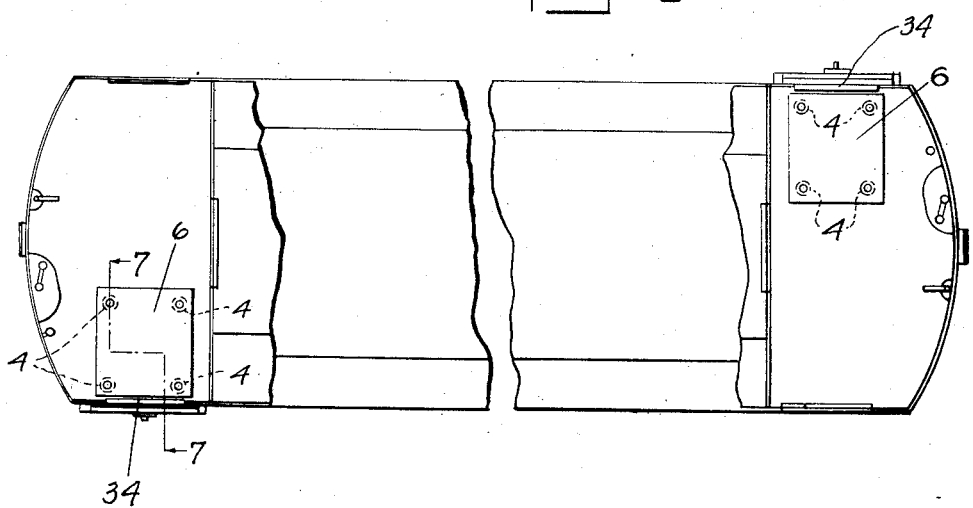
Fig. 6 shows the invention as applied to an ordinary street car.

In Figs. 4 and 5 of the drawings which show the invention applied to a passenger carrying bus of the double deck type, it will be noted that the movable platform has been constructed to include also the steps 28 by which the passenger enters and leaves the vehicle, the counter-balancing supports being so arranged as to lift the steps and the platform vertically with respect to the under support 30, which also comprises a step-like structure.

In Figs. 6 to 9 inclusive, which show the invention applied to an ordinary street car, the invention is designed to permit the operation of the street car by a single operator, the passenger preferably entering the car at the front end where he is under the supervision of the combined motorman and conductor, and leaving the car at the rear end, which is preferably provided with one of the safety platforms 6 to indicate to the motorman when the passenger has left the car. The illustrated car is of the type having a folding step 32 arranged to be moved down into step position when the door 34 of the car adjacent to the step is open. To prevent the step from being folded and the door closed while the passenger is standing on the platform, a latch 36 is preferably so arranged on the under side of the platform that when the platform is depressed it stands behind the arm 38 of the step and thus prevents rocking of the step with the shaft 40.

In Figs. 10 to 12 inclusive, the invention is shown as applied to platforms such as are used at elevated and subway stations and at ordinary train stations and in this embodiment of the invention there is also preferably provided means for directing the movements of the streams of passengers which enter and leave the cars to prevent interference at times of congestion.

In the embodiment of the invention illustrated in Figs. 10 to 12 inclusive, the counter-balanced platforms 6 which are mounted on the stationary station platforms 42 are preferably somewhat longer than when these platforms are carried in the vehicles, so that the platform will extend somewhat to either side of the door of the train which it is designed to control. To separate the line of passengers desiring to enter the vehicle from those leaving it and to direct both lines over the counter-balanced platform 6, there is preferably provided a railing 44 extending the full length of the platform 6 and preferably somewhat beyond it, and spaced from the edge of the platform 42 the desired distance, along which rail 44 a transverse arm 46 is adapted to slide which arm extends across the platform 6 and approximately to the side of the train, the slidable sleeve 48 which carries the arm 46 on the railing 44, having also connected thereto a depending arm or rod 50 connected to a screw-threaded sleeve 52 traveling on an endless screw 54 extending lengthwise beneath the station platform 42 and connected to all of the arms or gates 46 in such manner that all will be simultaneously operated by the turning of said screw. The screw may be operated in any suitable manner as, for example, through pulleys 56 and 58 connected by belts 60 and 62 to oppositely driven motors or other means for reversing the direction of turning the screw 54.

In the illustrated embodiment of the invention, it is the intention that the passengers leaving the vehicle shall turn to the right. To prevent passengers who desire to enter the vehicle from trying to enter against the stream leaving the vehicle, a swinging gate 64 is preferably provided so arranged that it may be locked in closed condition when desired. It will ordinarily not be necessary to lock this gate in closed condition, but during rush hours to keep the crowd off the platform 6 when no train is in the station, the gate 64 will preferably be locked in closed condition and the gate 46 moved to the other end of the platform, thus effectively preventing people from standing upon the platform 6 and operating a station-located signal or control when no train is in the station.

To effect such locking of the gate 64, means is arranged to be operated by the gate 46 when it has moved to its end of the platform 6, through which the locking of the gate 64 is effected and maintained. As shown in Figs. 12 and 13, a lever 66 fulcrumed in a support 68 beneath the platform 42 has at one end a cam face 70 arranged to be engaged by the under side of the sleeve 52 to rock the other arm of the lever upwardly and this other arm of the lever carries the cam roller 72 working in a spiral cam 74 carried by the vertical shaft 76 upon which the gate 64 is mounted, the cam 74 having at its upper end a vertical portion, into which the roller 72 enters when the sleeve 52 has engaged the cam 70, thus locking the gate 64 in closed condition. It will be noted that this engagement of the cam 70 by the sleeve 52 takes place when the gate 46 is at the end of the platform 6 remote from the gate 64.

Except during rush hours the gate 46 will preferably be located at a position to the right of the door of the vehicle as viewed by passengers standing on the platform facing the vehicle at the time the vehicle stops at the platform, thus directing the passengers leaving the vehicle to their right and through the gate 64. When they have left the vehicle the endless screw 54 is operated to move the gate 46 to the left of the door, thus permitting the passengers waiting on the platform to enter the vehicle. It will be noted that both streams of passengers must pass over the platform 6. These passengers will, some of them, be standing on the platform 6 while the other passengers are leaving the vehicle, but will be permitted to enter the vehicle only when the gate 46 has been moved to the left of the door and thus there will be a continuous signal until the last passenger has entered the vehicle.

I claim:

1. In apparatus of the class described, the combination with means for indicating when passengers have entered or left a passenger-carrying vehicle, comprising a movable, normally counter-balanced platform over which a passenger must pass to enter or leave the vehicle, and a signal operated by the displacement of said platform due to the weight of the passenger, of means for preventing entry upon said platform when the vehicle door is not open, comprising a stationary railing on the side of said platform opposite said door, and a transverse gate movable along said railing from one side of said door to the other.

2. In apparatus of the class described, the combination with means for indicating when passengers have entered or left the cars of a passenger-carrying train, comprising normally counter-balanced platforms over which the passengers must pass to enter or leave the cars, a signal operated by the displacement of any platform due to the weight of a passenger standing thereon, of gates movable along the train from one side of the respective doors of the train to the other side for separating the passengers leaving the vehicle from those entering, and a common means for operating said gates.

3. The combination with an apparatus of the class described, of an enclosure having an opening at each side of the door of a vehicle, a railing facing said door, and means within said enclosure and substantially transverse to said door for separating the passengers leaving from those entering the vehicle.

4. The combination with an apparatus of the class described, of means for regulating passengers passing through the door of a vehicle comprising an enclosure having an opening at each side of the door of the vehicle, and horizontally displaceable means within said enclosure and substantially transverse to said door for controlling said openings.

5. In apparatus of the class described, the combination with a normally counter-balanced platform over which a passenger must pass when entering or leaving a vehicle and a stationary support therefor, of means comprising plungers fastened to the platform and passing through holes in the stationary support, and means in the latter for limiting the ascending movement of the plungers.

6. In apparatus of the class described, the combination with a normally counter-balanced platform over which a passenger must pass when entering or leaving a vehicle and a stationary support therefor, of means comprising plungers fastened to the movable platform and passing through holes in the stationary support, and means carried by the plungers for limiting the ascending movement of the plungers.

7. In apparatus of the class described, the combination with a movable counter-balanced platform over which a passenger must pass when entering or leaving a vehicle and a stationary support therefor, of means for keeping the movable platform in a balanced normal condition comprising plungers for controlling the movable platform, sockets for guiding the plungers, bottoms in said sockets, resilient means interposed between the bottoms and the movable platform for raising the latter, and means for limiting the ascending movement of the plungers.

8. In apparatus of the class described, the combination with a movable counter-balanced platform over which a passenger must pass when entering or leaving the vehicle and a stationary support therefor, of means for keeping the movable platform in a balanced normal condition comprising plungers for controlling the movable platform, sockets for guiding the plungers, bottoms in said sockets, resilient means interposed between the bottoms and the movable platform for raising the latter, and adjustable means for limiting the ascending movement of the plungers.

9. In apparatus of the class described, the combination with a movable counter-balanced platform over which a passenger must pass when entering or leaving a vehicle and a stationary support therefor, of means for keeping the movable platform in a balanced normal condition comprising plungers for controlling said movable platform, said plungers being carried by the movable platform, sockets carried by the stationary support for guiding said plungers, bottoms in said sockets, resilient means interposed between the bottoms and the movable platform for raising the latter, and means for limiting the ascending movement of the platform.

10. In apparatus of the class described, the combination with a movable counter-balanced platform over which a passenger must pass when entering or leaving a vehicle, a stationary support therefor, of means for keeping the movable platform in a balanced normal condition comprising plungers carrying the movable platform and having a shoulder for affording guidance and a maximum descending stop to said platform, sockets carried by the stationary support and having a bottom and a recess adapted to receive the plungers' shoulder, resilient means interposed between the plungers' shoulder and the sockets' bottom for raising the plungers, and a stop carried by the plungers for limiting the ascending movement thereof.

11. In apparatus of the class described, the combination with a movable counter-balanced platform over which a passenger must pass when entering or leaving a vehicle and a stationary support therefor, of means for keeping the movable platform in a balanced normal condition comprising plungers carrying the movable platform and having a shoulder for affording guidance and a maximum descending stop to said platform, sockets carried by the stationary support and having a recess adapted to receive said plungers' shoulder to afford a fixed descending stop therefor and a vertically adjustable bottom, resilient means interposed between the plungers' shoulder and the adjustable bottom for raising the plungers, locking means for said adjustable bottoms and a stop carried by the plungers for limiting the ascending movement thereof.

12. In apparatus of the class described, the combination with a movable counter-balanced platform over which a passenger must pass when entering or leaving a vehicle and a stationary support therefor, of means for keeping the movable platform in a balanced normal condition comprising plungers carrying the movable platform and having a shoulder for affording guidance and a maximum depression stop to said platform, sockets carried by the stationary support and having a recess adapted to receive said plungers' shoulder to afford a fixed descending stop therefor and a vertically adjustable bottom, resilient means interposed between the plungers' shoulder and the adjustable bottom for raising the plungers, locking means for said adjustable bottoms and vertically adjustable stops carried by the plungers for limiting the ascending movement thereof and for exerting tension on the resilient means.

13. In apparatus of the class described, the combination with a movable counter-balanced platform over which a passenger must pass when entering or leaving a vehicle and a stationary support therefor, of means for keeping the movable platform in a balanced normal condition comprising plungers carrying the movable platform and having a shoulder for affording guidance and a maximum depression stop to said platform, sockets carried by the stationary support and having a recess adapted to receive said plungers' shoulder to afford a fixed descending stop therefor and an open threaded end, a threaded bottom in each socket, locking means for said bottom, resilient means interposed between the plungers' shoulder and the adjustable bottom for raising the plungers, adjustable stops carried by the plungers for limiting the ascending movement thereof and for exerting tension on the resilient means, and locking means for said plungers' adjustable stops.

14. In apparatus of the class described, the combination with a movable counter-balanced platform over which a passenger must pass when entering or leaving a vehicle, and a stationary support therefor, of means for keeping the movable platform in a balanced normal condition comprising plungers carrying the movable platform and having a shoulder for affording guidance and maximum depression stop to said platform, sockets carried by the stationary support and having a recess adapted to receive said plungers' shoulder to afford a fixed descending stop therefor and an open threaded end, a threaded bottom at about the middle of each socket, locking means for said bottom, resilient means interposed between the plungers' shoulder and the adjustable bottom for raising the plungers, adjustable stops carried by the plungers for limiting the ascending movement thereof, locking means for said plungers' adjustable stops, and insulated switch members of an electrical circuit in said plungers and in said sockets so that when the movable platform is displaced from its normally counter-balanced position the circuit is closed.

Signed at New York city, N. Y., this 1st day of December, 1921.

JOSEPH HOFFAY.